US005671970A

United States Patent [19]
Edelmann

[11] Patent Number: 5,671,970
[45] Date of Patent: Sep. 30, 1997

[54] WIND DEFLECTOR FOR MOTOR VEHICLE SUNROOF

[75] Inventor: Kenneth D. Edelmann, Auburn Hills, Mich.

[73] Assignee: Webasto Sunroofs, Inc., Rochester Hills, Mich.

[21] Appl. No.: 604,677

[22] Filed: Feb. 21, 1996

[51] Int. Cl.$^6$ ....................................................... B60J 7/22
[52] U.S. Cl. ......................................... 296/217; 296/208
[58] Field of Search ................................... 296/208, 217, 296/180.1; 454/129

[56] References Cited

U.S. PATENT DOCUMENTS

| 4,661,671 | 4/1987 | Davis | 296/217 |
| 5,431,477 | 7/1995 | Smith et al. | 296/217 |

FOREIGN PATENT DOCUMENTS

| 351232 | 10/1985 | Germany | 296/217 |

*Primary Examiner*—Dennis H. Pedder
*Attorney, Agent, or Firm*—Cushman Darby & Cushman IP Group of Pillsbury Madison & Sutro LLP

[57] ABSTRACT

A wind deflector for use in a sunroof for a motor vehicle includes an elongate body having a plurality of openings formed therethrough and spaced along a longitudinal extent of the body. The openings are each defined by an upper portion, a lower portion, and a pair of side portions disposed on opposite sides of the opening. The upper portion has an operative surface that extends downwardly as it extends rearwardly relative to the motor vehicle so as to be able to direct air downwardly and rearwardly through the sunroof aperture when the elongate body is in the deployed position. The lower portion has an operative surface which extends downwardly as it extends rearwardly relative to the motor vehicle and which generally converges with the operative surface of the upper portion as the operative surfaces of the upper and lower portions extend downwardly and rearwardly so as to enable air to be funneled generally vertically and through the opening and through the sunroof aperture. The pair of side portions connect the upper portion with the lower portion at opposite sides of the opening, respectively, and the side portions provide respective surfaces that are generally concave as they extend from the upper portion to the lower portion and that generally converge towards one another as they extend rearwardly relative to the motor vehicle so as to enable air to be funneled generally horizontally and through the opening.

5 Claims, 4 Drawing Sheets

WIND DEFLECTOR FOR MOTOR VEHICLE SUNROOF

BACKGROUND OF THE INVENTION

The present invention relates to sunroofs for motor vehicles, and particularly to sunroof wind deflectors for reducing the noise within the vehicle when the sunroof is opened.

It is known in the art to provide a wind deflector which, when deployed, is disposed substantially above the roof line and has its longitudinal extent extending transversely of the motor vehicle along the leading edge of the sunroof aperture. The deployed wind deflector is intended to reduce the noise created as a result of pressure fluctuations resulting from the shear layer between the exterior air flow and the relatively static air within the vehicle passenger compartment.

Two different types of wind deflectors have been proposed. In the first type, the wind deflector deflects air away from the sunroof aperture to reduce the high frequency broadband noise or "wind rush." While these wind deflectors are somewhat effective, they do not effectively reduce the noise boom that occurs at speeds within the critical range of about 30 to 70 miles per hour.

In the second type of wind deflector, wind is deflected downwardly through the sunroof aperture and into the confines of the passenger compartment in order to break up the shear layer between the air flow passing above the sunroof aperture and the air within the vehicle. One such wind deflector is proposed in U.S. Pat. No. 5,431,477, which utilizes an upper vane formation that has a trailing portion that is inclined downwardly relative to the inclination of the front portion of the vane and the roof line in order to form a concave shaped upper vane that deflects air into the passenger compartment. The configuration proposed in this patent is also not entirely effective in reducing the noise boom.

It is an object of the present invention to provide a wind deflector that effectively reduces noise boom and overcomes the deficiencies in the embodiments proposed by the prior art. In accordance with the present invention, there is provided a wind deflector for use in a sunroof for a motor vehicle comprising an integrally formed elongate body constructed and arranged to be disposed in a deployed position wherein the body projects at least partially above the level of the vehicle roof and extends transversely of the motor vehicle along a leading edge of the sunroof aperture. The elongate body has a plurality of openings formed therethrough and spaced along a longitudinal extent of the body, the openings each being defined by 1) an upper portion defining an upper extremity of the opening, 2) a lower portion defining a lower extremity of the opening, and 3) a pair of side portions disposed on opposite sides of the opening and defining lateral extremities of the opening. The upper portion has an operative surface constructed and arranged to extend downwardly as it extends rearwardly relative to the motor vehicle so as to be able to direct air downwardly and rearwardly through the sunroof aperture when the elongate body is in the deployed position. The lower portion has an operative surface which extends downwardly as it extends rearwardly relative to the motor vehicle and which generally converges with the operative surface of the upper portion as the operative surfaces of the upper and lower portions extend downwardly and rearwardly so as to enable air to be funneled generally vertically and through the opening and through the sunroof aperture. The pair of side portions are constructed and arranged to connect the upper portion with the lower portion at opposite sides of the opening, respectively. The side portions provide respective surfaces that are generally concave as they extend from the upper portion to the lower portion and that generally converge towards one another as they extend rearwardly relative to the motor vehicle so as to enable air to be funneled generally horizontally and through the opening.

It has been found that this construction not only minimizes "wind rush" effectively, but also reduces the low frequency pressure differentials within the compartment, that cause "wind throb" noises that occur at lower vehicle speeds.

This and other objects of the present invention will become more apparent during the course of the following detailed description and appended claims.

The invention may be best understood with reference to the accompanying drawings, wherein an illustrative embodiment is shown.

DETAILED DESCRIPTION OF THE DRAWINGS

Figure 1:
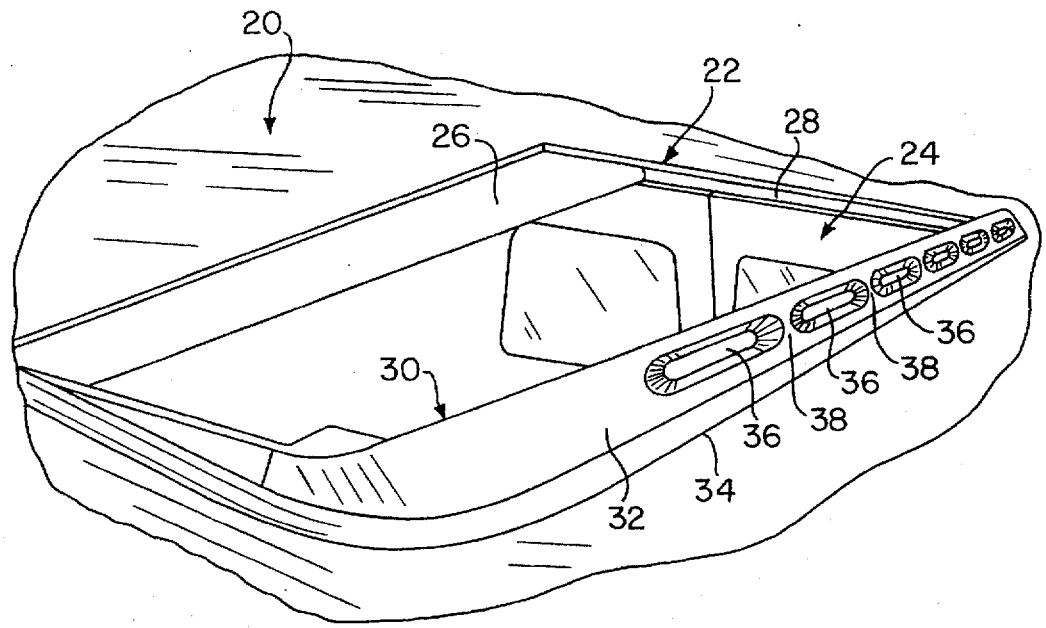
FIG. 1 is a perspective view of a vehicle roof having a sunroof incorporating a wind deflector in accordance with the present invention.

FIG. 1 is a perspective view of a vehicle roof, generally indicated at 20, incorporating a sunroof, generally indicated at 22. The sunroof 22 defines an aperture 24 and includes a slidable roof panel 26, which slides along a track assembly 28 between a rear position in which aperture 24 is exposed, and a forward position wherein the aperture 24 is sealed. The sunroof 22 further includes a wind deflector 30 in accordance with the principles of the present invention. The wind deflector 30 comprises an integrally formed elongate body 32, preferably made from a suitable plastic material in a conventional injection molding operation. In the most preferred embodiment, the plastic material of the wind deflector is a glass-filled polyester.

As shown, the elongate body 32 extends transversely of the motor vehicle along a leading edge 34 of the sunroof aperture. The elongate body has a plurality of openings 36 formed therethrough. The openings are spaced from one another along the longitudinal extent of body 32 and are separated from one another by partition portions 38.

Figure 2:
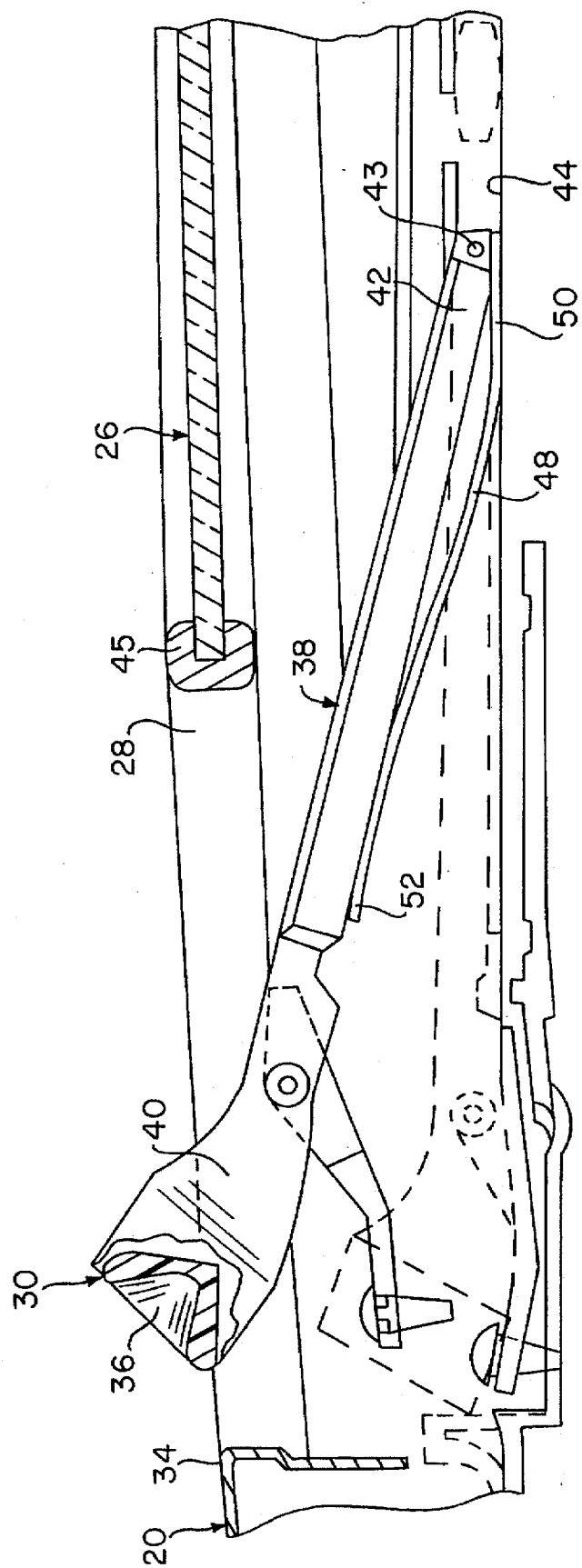
FIG. 2 is a side cross-sectional view through the roof and wind deflector illustrated in FIG. 1.

FIG. 2 is a cross-sectional view taken through the vehicle roof, sunroof, and wind deflector in accordance with the present invention. The cross-sectional view in FIG. 2 is taken through one of the openings 36 in the wind deflector 30. Also in FIG. 2, it can be appreciated that the body 32 of the wind deflector is disposed in a deployed position wherein it projects at least partially above the level of the vehicle roof 20.

The wind deflector 30 is mounted at opposite longitudinal ends thereof, on a pair of spaced elongated arms 38 (one arm being shown in FIG. 2). Distal ends 42 of the arms 38 are pivotally mounted on respective side ledges 44 extending longitudinally along opposite sides of the sunroof aperture, the ledges 44 being disposed below and closer to the center of the vehicle relative to the track assemblies 28. As shown, a leaf spring member 48 has one end 50 thereof rigidly fixed to ledge 44 proximate the distal end 42 of arm 38. An opposite end 51 of the sprang member 48 engages the arm 38 at an intermediate position between the distal end 42 and a proximate end 40 and biases the arm 38 to pivot about a pivot member 43 so as to cause proximate end 40 to move in an upward direction so as to cause the wind deflector 30 to be raised. As shown in the solid line drawing in FIG. 2, the wind deflector extends above the level of the vehicle roof 20 into its deployed position as a result of the biasing force of spring member 48 when the sunroof is opened.

It can be appreciated that when the slidable roof panel 26 is moved forwardly so as to close the sunroof aperture 24, a forward portion 45 of the slidable roof panel 26 will engage the arm 38 so as to cause the arm 38 to be pivoted against the bias of spring member 48 so that the entire wind deflector and arm 38 is disposed beneath the level of roof 20 when the slidable roof panel closes the aperture 24. The arm 38 and wind deflector 30 assume the position shown in the dashed-line configuration, below the roof line, when the roof panel 26 is closed.

Figure 3:
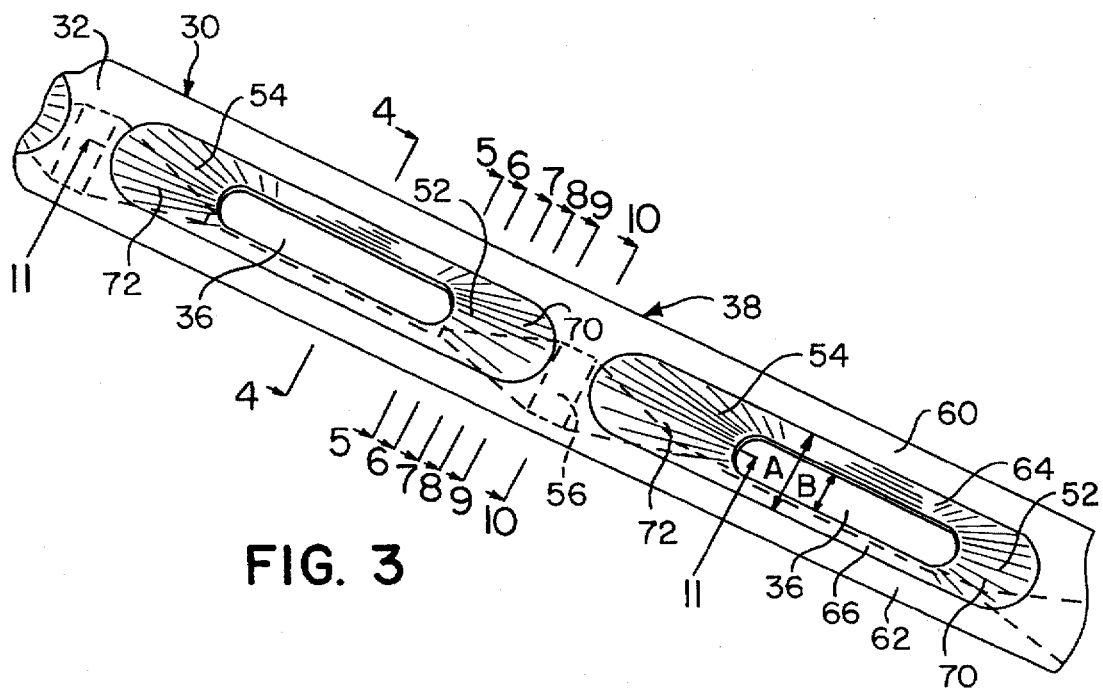
FIG. 3 is a partial plan view of the longitudinal extent of the wind deflector in accordance with the principles of the present invention.

FIG. 3 is a partial front plan view of the body 32 of the wind deflector 30. In FIG. 3, two of the openings 36 are shown. The openings 32 are separated by a partition section, generally indicated at 38. As shown, the partition section comprises a side portion 52 defining a lateral extremity of one of the openings, and another side portion 54 comprising the lateral extremity of an adjacent one of the openings 36. In addition, the partition section 38 includes an intermediate portion 56 disposed between the side portions 52 and 54.

As can also be appreciated from FIG. 3, the openings 36 are each defined by an upper portion 60 defining an upper extremity of the opening, and a lower portion 62 defining a lower extremity of the opening. The upper portion 60 of each opening has an operative surface 64 constructed and arranged to extend downwardly as it extends rearwardly relative to the motor vehicle, and enables air incident thereupon to be directed downwardly and rearwardly through the sunroof aperture when the wind deflector is deployed. The term "operative surface" as used herein refers to the surface which is primarily responsible for guiding air as it passes through the openings 36. The lower portion 62 of each opening has an operative surface 66 which extends downwardly as it extends rearwardly relative to the motor vehicle. The operative surface 66 of the lower portion 62 generally converges with, or becomes more proximate to, the operative surface 64 of the upper portion 60 as the operative surfaces 66 and 64 extend downwardly and rearwardly. This enables air to be funneled generally in a vertical direction through the opening 36 and through the sunroof aperture 24. More particularly, at its forward extremity, the opening 36 has a generally vertical length A (preferably about 16 to 20 mm), while at its rear extremity, it has a generally vertical length B (preferably about 8 to 10 mm), which is smaller than the vertical length A. As a result, air entering through the forward portion of the opening A is funneled generally in a vertical direction between the lower of the operative surface 66 and the upper of the operative surface 64 as it exits the wind deflector through the rearward end of the opening having the diameter B.

Each opening 36 has the pair of side portions 52 and 54 disposed on opposite sides thereof for defining the lateral extremities of the opening. The side portions 52 and 54 connect the upper portion 60 with the lower portion 62 which defines each opening 36. The side portions 52 and 54 have respective surfaces 70 and 72 that are generally concave as they extend from the upper portion 60 to the lower portion 62. The surfaces 70 and 72 generally converge towards one another as they extend rearwardly relative to the motor vehicle and as they approach the rearward portion of the opening 36 having the diameter B so as to enable air to be funneled generally horizontally and through the opening 36.

Figure 4:
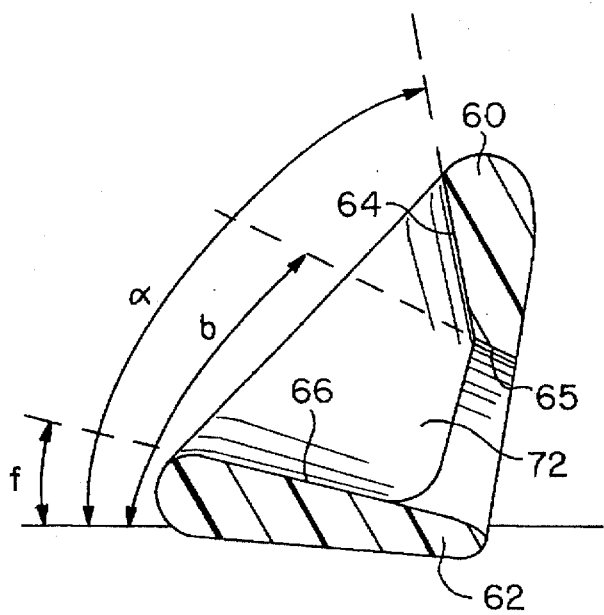
FIG. 4 is a cross-sectional view of the wind deflector taken through the line 4—4 in FIG. 3.
Figure 5:
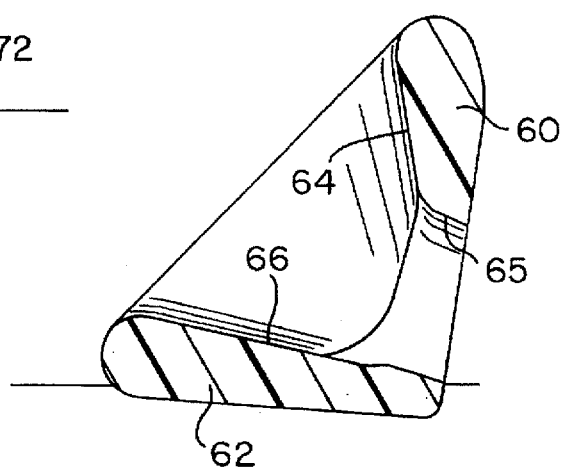
FIG. 5 is a cross-sectional view of the wind deflector taken through the line 5—5 in FIG. 3.
Figure 6:
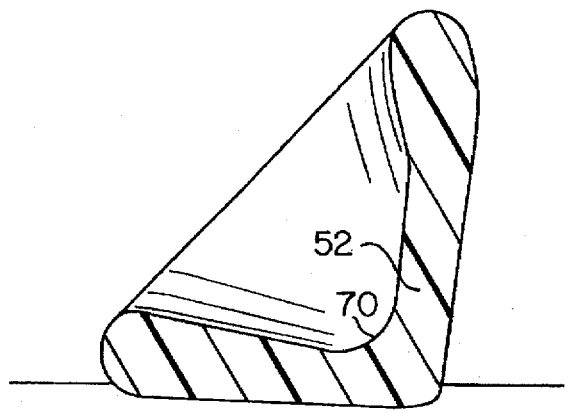
FIG. 6 is a cross-sectional view of the wind deflector taken through the line 6—6 in FIG. 3.
Figure 7:
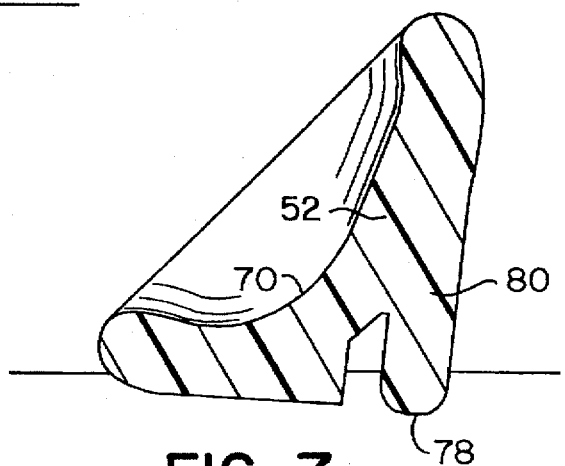
FIG. 7 is a cross-sectional view of the wind deflector taken through the line 7—7 in FIG. 3.
Figure 8:
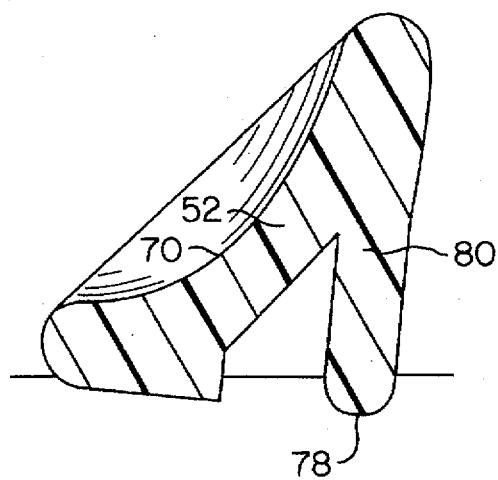
FIG. 8 is a cross-sectional view of the wind deflector taken through the line 8—8 in FIG. 3.
Figure 9:
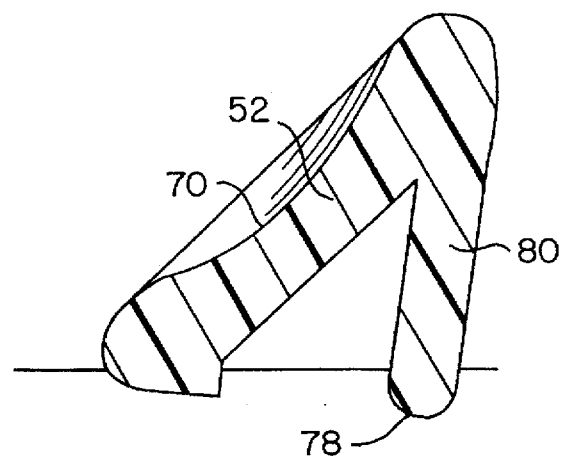
FIG. 9 is a cross-sectional view of the wind deflector taken through the line 9—9 in FIG. 3.

FIGS. 4 through 10 are progressive cross-sectional views taken through the lines 4—4, 5—5, 6—6, 7—7, 8—8, 9—9, and 10—10, respectively, in FIG. 3. As shown in FIG. 4, the upper portion 60 has an operative surface 64 that extends downwardly as it extends rearwardly relative to the motor vehicle and directs air downwardly and rearwardly through the sunroof aperture. The lowermost portion 65 of the operative surface is slightly flared so that it extends to a relatively smaller angle with respect to the roof line than the major portion of surface 64. More particularly, while the major portion of surface 64 preferably forms an angle α of about 82°–83° relative to the roof line, the portion 65 preferably forms an angle b of about 50° relative to the roof line.

The lower portion 62 has an operative surface 66 that extends downwardly as it extends rearwardly, relative to the motor vehicle. Preferably, the operative surface 66 of the lower portion forms an angle F, between 17°–18° relative to the roof line. It can thus be appreciated that these operative surfaces form an angle of about 65°–66° with respect to one another. From FIG. 4 it can also be appreciated that the operative surfaces 64 and 66 generally converge, or become closer to one another, as they extend downwardly and rearwardly. As also shown, the surface 72 of the side portion 54 connecting the upper portion 60 with the lower portion 62 is generally concave, as it extends from the upper portion 60 to the lower portion 62. This concave configuration of the side surface 72 can be appreciated more readily from FIGS. 6–9.

From the progression of FIGS. 7–10, it can also be appreciated that a rearward flange portion 80 is optionally provided at areas rearwardly of the side portions 54 and 52 and also rearwardly of the intermediate portion 56. The rearward flange portion 80 is integrally connected at its upper end with the upper rearward portions of the side portions 52 or 54 and extend generally directly downwardly therefrom, and terminates in a generally free end 78.

Figure 10:
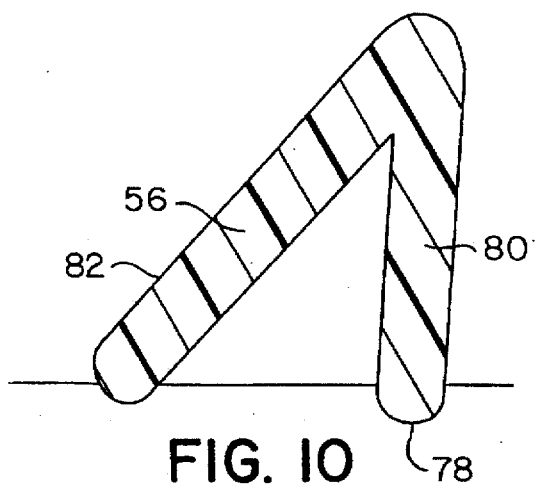
FIG. 10 is a cross-sectional view of the wind deflector taken through the line 10—10 in FIG. 3.

As shown in FIG. 10, the intermediate portion 56 has a generally flat front surface 82 that extends generally upwardly as it extends rearwardly relative to the motor vehicle to direct air generally upwardly and over the sunroof aperture in order to further break-up the shear layer of air passing over the sunroof and to minimize resonance at high frequency levels.

Figure 11:
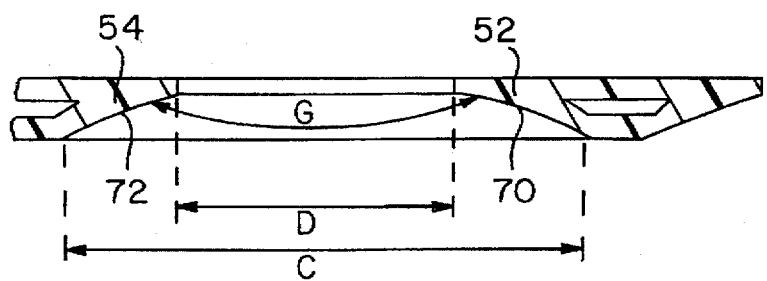
FIG. 11 is a longitudinal sectional view taken through the line 11—11 in FIG. 3.

FIG. 11 is a longitudinal sectional view taken through the line 11—11 in FIG. 3. As shown, the respective front concave surfaces 70 and 72 of side portions 52 and 54 generally converge towards one another as they extend rearwardly relative to the motor vehicle so as to enable air to be funneled generally horizontally and through the opening 36. The front end of the opening 36 has a diameter C, while the rearward end of the opening 36 has a horizontal diameter D (preferably about 50 mm), which is smaller than the horizontal diameter C (preferably about 100 mm). As a result, air traveling through the opening 36 will be funneled in a generally horizontal fashion as it passes through the opening 36. An angle G, preferably about 141° to 142° is formed between the converging surfaces 70 and 72, as shown.

The funneling action of the operative surfaces 64, 66, 70 and 72 significantly increases the velocity of the air passing through the openings 36, and thus maximizes the air flow into the vehicle compartment at vehicle speeds at which resonance within the vehicle occurs. That is, the more that the vehicle is filled with air at the critical speeds, the less booming noise will occur. Because the funneling action of the surfaces surrounding the openings greatly increases air flow into the vehicle at the critical speeds, the booming noise is significantly reduced. Furthermore, by inducing an air flow into the pulsating negative pressure zone at the sunroof opening at resonant vehicle velocities, the pressure differential in the vehicle is reduced, thereby reducing the volumetric resonance. In addition, it should also be noted that the configuration of the wind deflector accomplishes the significant increase of air flow into the vehicle without significantly increasing the total surface area of the wind deflector required.

In a preferred embodiment, the openings 36 disposed towards the center of the wind deflector direct air directly rearwardly into the compartment, while the openings towards the ends of the deflector direct air angularly away from the center of the vehicle in order to more evenly distribute the air flow into the vehicle compartment in order to fill all negative pressure zones within the compartment. For example, as shown in FIG. 3, the opening 36 shown disposed toward the left side of the page is constructed and arranged to direct air directly rearwardly within the vehicle, as the side surfaces 70 and 72 thereof extend generally at the same angle with respect to a longitudinal direction of the vehicle. In contrast, the opening 36 disposed toward the right side of the page in FIG. 3 is constructed and arranged to direct air generally towards the right (i.e., more towards the driver's side) within the vehicle compartment. More particularly, the surface 72 defining the left extremity of this opening 36 is angled to a greater extent relative to the longitudinal axis of the vehicle than surface 70, which defines the right extremity of the opening. This can be appreciated from the fact that the rearward portion of the opening (having the vertical length B) is laterally off-center relative to the front portion of the opening (having the vertical length A). It can be appreciated that openings 36 disposed above the passenger side of the vehicle would be constructed and arranged to direct air further to the left (i.e., further towards the passenger's side) within the vehicle. As a result of the configuration of the surfaces in this preferred embodiment of the wind deflector, a generally shell-like distribution of air is provided into the interior of the vehicle compartment.

It thus will be seen that the objects of this invention have been fully and effectively accomplished. It will be realized, however, that the foregoing preferred specific embodiment has been shown and described for the purpose of this invention, and is subject to change without departure from such principles. Therefore, this invention includes all modifications encompassed within the spirit and scope of the following claims.

What is claimed is:

1. A wind deflector for use in a sunroof for a motor vehicle comprising an integrally formed elongate body constructed and arranged to be disposed in a deployed position wherein said body projects at least partially above the level of the vehicle roof and extends transversely of the motor vehicle along a leading edge of the sunroof aperture, said elongate body having a plurality of openings formed therethrough and spaced along a longitudinal extent of said body, said openings each being defined by 1) an upper portion defining an upper extremity of said opening, 2) a lower portion defining a lower extremity of said opening, and 3) a pair of side portions disposed on opposite sides of said opening and defining lateral extremities of said opening, said upper portion having an operative surface constructed and arranged to extend downwardly as it extends rearwardly relative to the motor vehicle so as to be able to direct air downwardly and rearwardly through the sunroof aperture when said elongate body is in said deployed position, said lower portion having an operative surface which extends downwardly as it extends rearwardly relative to the motor vehicle and which generally converges with the operative surface of said upper portion as said operative surfaces of the upper and lower portions extend downwardly and rearwardly so as to enable air to be funneled generally vertically and through said opening and through the sunroof aperture, said pair of side portions being constructed and arranged to connect said upper portion with said lower portion at opposite sides of said opening, respectively, and said side portions providing respective surfaces that are generally concave as they extend from said upper portion to said lower portion and that generally converge towards one another as they extend rearwardly relative to the motor vehicle so as to enable air to be funneled generally horizontally and through said opening.

2. A wind deflector according to claim 1, wherein the surfaces defining at least one opening disposed on a left side of a longitudinal axis defining left and right halves of the vehicle are constructed and arranged to direct air angularly and further to the left within the vehicle compartment relative to the longitudinal axis of the vehicle, and wherein the surfaces defining at least one opening disposed on a right side of the longitudinal axis are constructed and arranged to direct air angularly and further to the right within the vehicle compartment relative to the longitudinal axis of the vehicle.

3. A wind deflector according to claim 1, wherein said operative surface of said upper portion has a leading portion thereof forming a greater angle relative to the roof line than a trailing portion thereof.

4. A wind deflector according to claim 1, wherein the surfaces of said side portions form an angle of between approximately 141° to 142° with respect to one another.

5. A wind deflector according to claim 1, wherein the operative surface of the upper portion forms an angle of about 65° to 66° with respect to the operative surface of the lower portion.

* * * * *